(12) United States Patent
Ishihara et al.

(10) Patent No.: US 6,628,693 B1
(45) Date of Patent: Sep. 30, 2003

(54) DISCHARGE ELECTRODE FOR LASER DEVICE

(75) Inventors: Takanobu Ishihara, Oyama (JP); Hirotoshi Inoue, Oyama (JP); Tsukasa Hori, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 325 days.

(21) Appl. No.: 09/663,940

(22) Filed: Sep. 18, 2000

(51) Int. Cl.$^7$ .............................................. H01S 3/097
(52) U.S. Cl. ............................................ 372/87; 372/65
(58) Field of Search ............................. 372/65, 87, 85, 372/81

(56) References Cited

U.S. PATENT DOCUMENTS

| | | | | |
|---|---|---|---|---|
| 3,636,472 A | * | 1/1972 | Leonard et al. ............. | 372/87 |
| 4,343,040 A | * | 8/1982 | Shibayama et al. .......... | 372/87 |
| 4,488,309 A | * | 12/1984 | Tanaka et al. ............. | 372/87 |
| 4,554,667 A | * | 11/1985 | Kaminski ................. | 372/83 |
| 4,617,668 A | * | 10/1986 | Rudko et al. .............. | 372/59 |
| 4,805,182 A | * | 2/1989 | Laakmann ................. | 372/82 |
| 4,833,686 A | * | 5/1989 | Eldridge .................. | 372/87 |
| 4,959,840 A | * | 9/1990 | Akins et al. .............. | 372/57 |
| 5,023,884 A | * | 6/1991 | Akins et al. .............. | 372/57 |
| 5,771,258 A | * | 6/1998 | Morton et al. ............. | 372/57 |
| 5,875,207 A | * | 2/1999 | Osmanow ................. | 372/86 |
| 6,208,674 B1 | * | 3/2001 | Webb et al. ............... | 372/57 |

* cited by examiner

Primary Examiner—Leon Scott, Jr.
(74) Attorney, Agent, or Firm—Armstrong, Westerman & Hattori, LLP.

(57) ABSTRACT

A discharge electrode for a laser device which can cause stable main discharge to occur is provided. To this end, the discharge electrode includes a cathode base (8) made of an insulating material for sealing up a chamber opening (7) provided in a laser chamber (2) for containing laser gases, a cathode (5) attached to the cathode base (8) with a bottom surface (5A) of the cathode (5) in contact therewith, and a plurality of high-voltage feeder rods (12) disposed in a longitudinal direction, penetrating through the cathode base (8) from an outside of the laser chamber (2) which supplies a high-voltage current to the cathode (5), in which an O-ring groove (22) for sealing in the laser gases is formed on the bottom surface of the cathode (5) to surround a plurality of holes (24) for fixing the high-voltage feeder rods (12) disposed on the bottom surface of the cathode (5).

2 Claims, 7 Drawing Sheets

DISCHARGE ELECTRODE FOR LASER DEVICE

TECHNICAL FIELD

The present invention relates to a discharge electrode for a laser device, and more particularly to the structure of the discharge electrode for the laser device.

BACKGROUND ART

A laser device which excites laser gases by electric discharge has been hitherto known and is shown, for example in U.S. Pat. No. 4,959,840. FIG. 12 is a sectional view of an excimer laser device 101 disclosed in the aforesaid Patent.

In FIG. 12, a pair of discharge electrodes 104 and 105 composed of an anode 104 and a cathode 105 are disposed facing each other with a predetermined space between them at predetermined positions inside a laser chamber 102 containing laser gases. In the excimer laser device 101, a high-voltage is applied to a space between the discharge electrodes 104 and 105 from a high-voltage power supply not illustrated to cause main discharge to occur, whereby the laser gases are excited to oscillate laser light.

A chamber opening 107 is disposed at the upper portion of the laser chamber 102, which is sealed up with insulating members 109 and 110 made of an insulating material such as a ceramic. A space between the laser chamber 102 and the insulating member 109 is sealed by an O-ring not illustrated. A cathode supporting member 108 made of a conductive material is attached to the insulating member 109 and the cathode 105 is fixed to the cathode supporting member 108.

A plurality of high-voltage feeder bolts 112 are screwed into the cathode supporting member 108, penetrating through base through-holes which are disposed in the insulating members 109 and 110 at predetermined intervals in a longitudinal direction. A high-voltage current for main discharge is supplied to the cathode 105 through these high-voltage feeder bolts 112.

FIG. 13 shows the bottom surface of the cathode supporting member 108. As shown in FIG. 13, cathode bolt holes 124, into which the high-voltage feeding bolts 112 are screwed, are disposed at predetermined intervals in the longitudinal direction in the cathode supporting member 108. At the bottom of the cathode 105, O-ring grooves 122 are disposed in such a manner to surround each of the cathode bolt holes 124. O-rings not illustrated are inserted inside the O-ring grooves 122 to seal the space between the cathode supporting member 108 and the insulating member 109.

However, the prior art disclosed in the aforesaid U.S. Pat. No. 4,959,840 has the following disadvantages.

Namely, in the prior art, as shown in FIG. 12 and FIG. 13, the O-ring groove 122 for scaling in the laser gases is provided to each of the high-voltage feeder bolt 112. Therefore, the interval between the high-voltage feeder bolts 112 is not allowed to be narrower than the outer periphery of the O-ring groove 122, and it is difficult to increase the number of the high-voltage feeder bolts 112.

Thereby, the high-voltage current flowing to each of the high-voltage feeder bolt 112 is increased and the discharge is easy to concentrate near the high-voltage feeder bolts 112 of the cathode 105 in main discharge. As a result, main discharge may be unstable and thus causing the disadvantage of variations occurring in the pulse energy of laser light for oscillating the pulse.

SUMMARY OR THE INVENTION

The present invention is made to eliminate the disadvantages in the aforesaid art, and its object is to provide a discharge electrode for a laser device which can cause stable main discharge to occur.

To attain the aforesaid object, the discharge electrode for the laser device according to the present invention has the structure including; a cathode base made of an insulating material for sealing up a chamber opening provided in a laser chamber for containing laser gases, a cathode attached to the cathode base with a bottom surface of the cathode in contact therewith, and a plurality of high-voltage feeder rods disposed in a longitudinal direction, penetrating through the cathode base from an outside of the laser chamber and supplying a high-voltage current to the cathode, and the structure in which an O-ring groove for sealing in the laser gases is formed on the bottom surface of the cathode to surround a plurality of holes for fixing the high-voltage feeder rods disposed on the bottom surface of the cathode.

According to the aforesaid structure, for a plurality of the high-voltage feeder bolts, one O-ring groove is used for sealing in the laser gases so that the intervals between the high-voltage feeder bolts are allowed to be narrower and the number of the high-voltage feeder bolts can be increased. Therefore, the high-voltage current flowing to each of the high-voltage feeder bolt is decreased and the high-voltage current is uniformly supplied to the cathode in the longitudinal direction. Thus, discharge concentrations are decreased and variations in pulse energy of laser light are decreased.

Moreover, the discharge electrode for the laser device may have the structure further including; a cathode bar in contact with the cathode on surfaces thereof, and the structure in which the high-voltage current is supplied to the cathode by means of the high-voltage feeder rod and the cathode bar.

According to the aforesaid structure, the high-voltage current is supplied to the cathode by contacting with surfaces thereof so that the high-voltage current is supplied more uniformly to the cathode in the longitudinal direction. As a result, the discharge concentrations are further decreased and the variations in the pulse energy of laser light are further decreased.

BEST MODE FOR CARRYING OUT THE INVENTION

Preferred embodiments according to the present invention will be explained in detail below with reference to the drawings.

Figure 1:
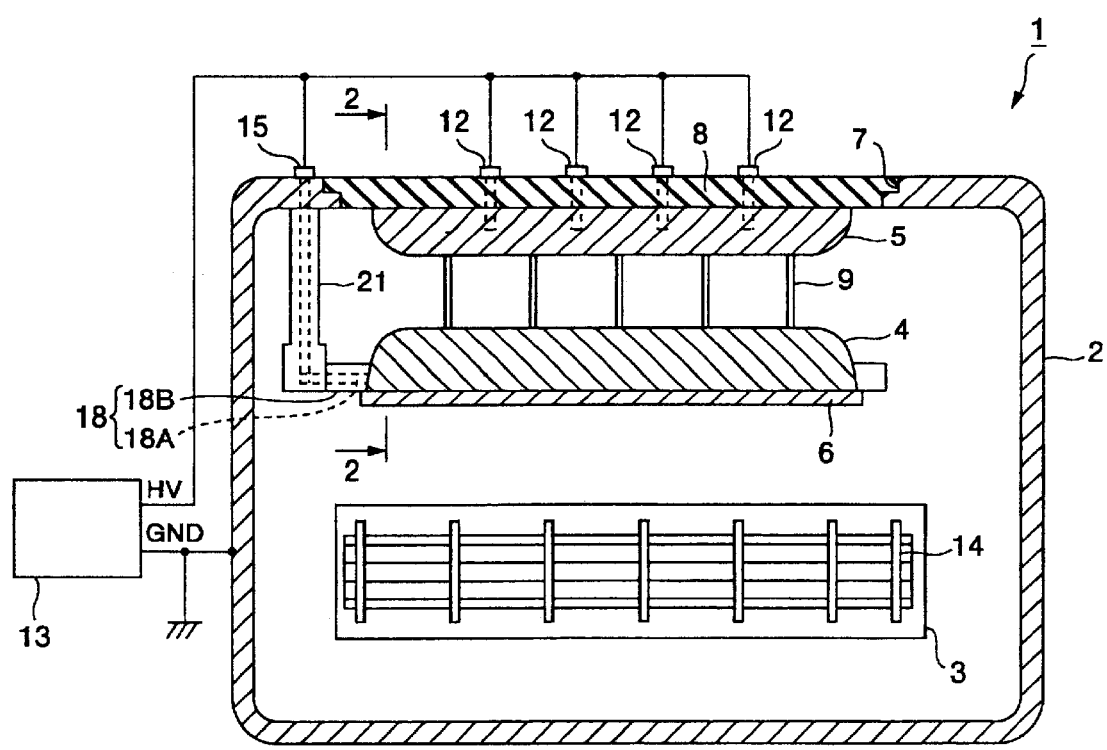
FIG. 1 is an explanatory view schematically showing the structure of a vertical section of an excimer laser device according to a first embodiment of the present invention.

First, a first embodiment will be described. FIG. 1 shows the schematic structure of an excimer laser device 1 according to the first embodiment, FIG. 2 is a sectional view taken along the line 2—2 in FIG. 1, and FIG. 3 is a sectional view taken along the line 3—3 in FIG. 2.

Figure 2:
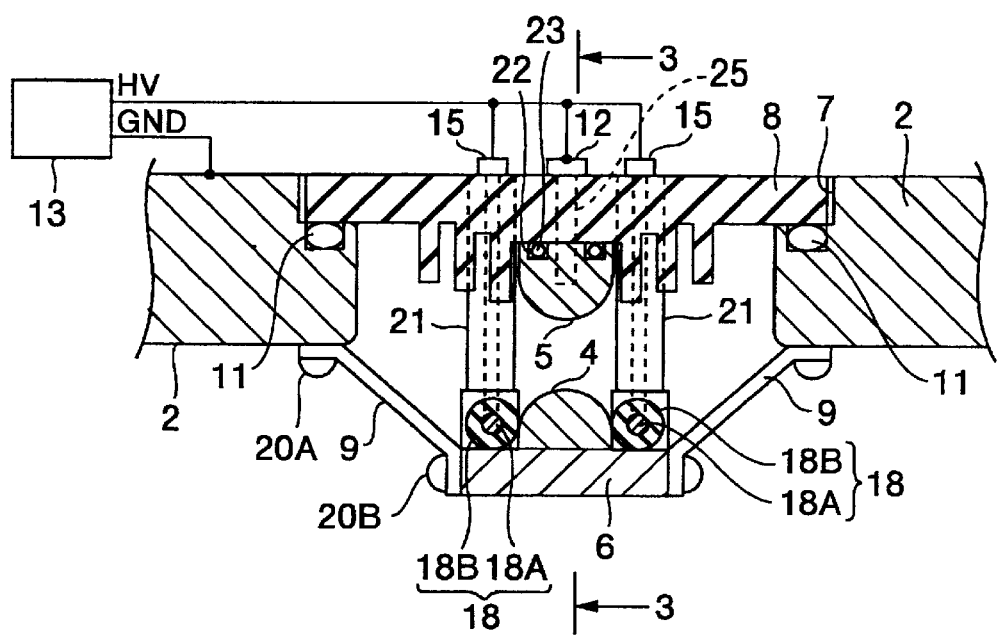
FIG. 2 is a sectional view taken along the line 2—2 in FIG. 1.
Figure 3:
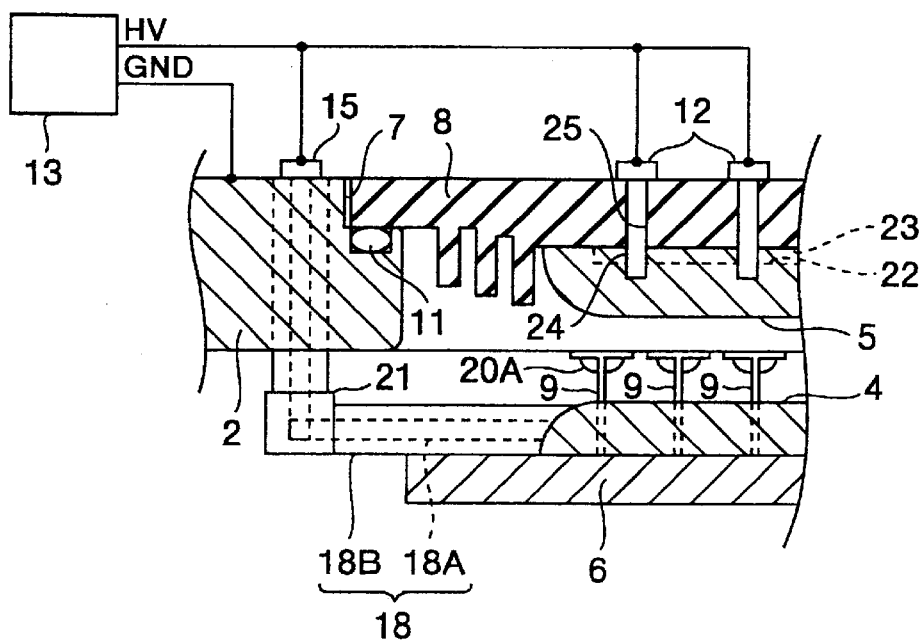
FIG. 3 is a sectional view taken along the line 3—3 in FIG. 2.

In FIG. 1 to FIG. 3, the excimer laser device 1 includes a laser chamber 2 containing a laser medium such as laser gases. A pair of discharge electrodes 4 and 5 composed of an anode 4 and a cathode 5 are disposed facing each other with a predetermined space between them at predetermined positions inside the laser chamber 2. In the excimer laser device 1, a high-voltage is applied to a space between the discharge electrodes 4 and 5 from a high-voltage power supply 13 via a discharge circuit not illustrated to cause main discharge to occur, whereby the laser gases are excited to oscillate laser light.

Inside the laser chamber 2, a flow-through fan 14 for sending the laser gases into the space between the discharge electrodes 4 and 5 and a heat exchanger 3 for cooling the laser gases heated by main discharge in the space between the discharge electrodes 4 and 5 are respectively disposed at predetermined positions.

A chamber opening 7 is disposed at the upper portion of the laser chamber 2, which is sealed up with a cathode base 8 made of an insulating material such as a ceramic. An O-ring 11 is fitted into a space between the laser chamber 2 and the cathode base 8 to seal in the laser gases. The cathode 5 is fixed to the cathode base 8, and the cathode 5 and the laser chamber 2 are electrically insulated from each other by the cathode base 8.

On the cathode base 8, a plurality of base through-holes 25 are disposed at predetermined intervals in a longitudinal direction, where a high-voltage feeder rod 12 is penetrating through each of the base through-holes 25 to reach cathode bolt holes 24 disposed in the cathode 5. External threads are formed on the tips of the high-voltage feeder rods 12 and internal threads are formed on the cathode bolt holes 24 so that the tips of the high-voltage feeder rods 12 are screwed into the cathode bolt holes 24. The high-voltage feeder rods 12 are connected to a negative high-voltage side HV of the high-voltage power supply 13 via a discharge circuit not illustrated to supply a high-voltage current used for main discharge to the cathode 5 through the high-voltage feeder rods 12.

Figure 4:
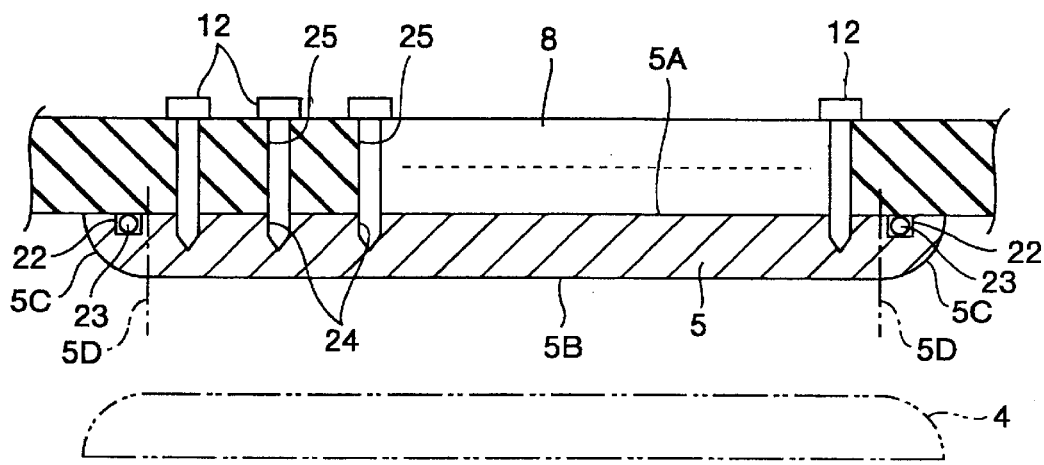
FIG. 4 is an explanatory view showing an attaching mechanism of a cathode base and a cathode in FIG. 1.

FIG. 4 shows the attaching structure of the cathode 5 and the cathode base 8. As shown in FIG. 4, the cathode 5 includes a bottom surface 5A contacting with the cathode base 8, an opposing surface 5B opposing to the anode 4 in a direction almost parallel to the bottom surface 5A, and end portions 5C and 5C disposed at the both end portions of the cathode 5, extending from the opposing surface 5B to the bottom surface 5A, while having a predetermined shape of slanting curved surface.

Figure 5:
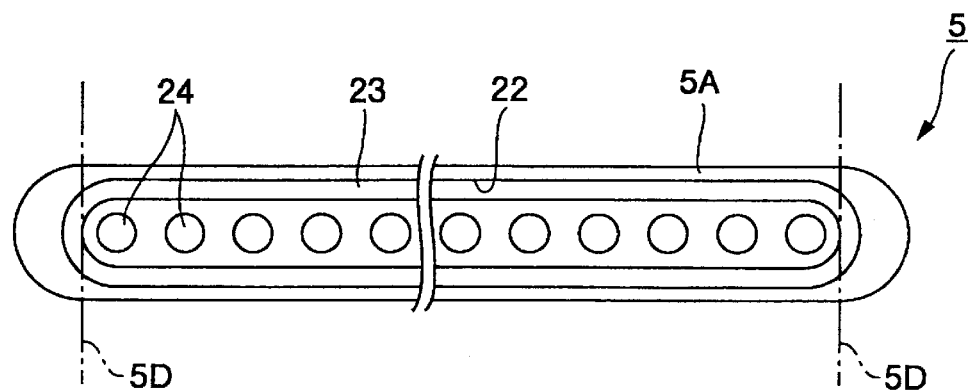
FIG. 5 is a bottom view of the cathode in FIG. 4 shown from its bottom surface.

FIG. 5 is a bottom view of the cathode 5 viewed from the bottom surface 5A. As shown in FIG. 4 and FIG. 5, the cathode bolt holes 24 are provided at predetermined intervals in the longitudinal direction in the almost center in the width direction of the cathode 5, into which the high-voltage feeding rods 12 are screwed. At the bottom surface 5A of the cathode 5, an O-ring groove 22 is disposed to go around the bottom surface 5A of the cathode in such a manner to surround all of the cathode bolt holes 24. In this situation, all of the cathode bolt holes 24 are provided inside boundaries 5D and 5D in the longitudinal direction, which are the boundaries between the end portions 5C and 5C and the opposing surface 5B.

An O-ring 23 is inserted inside the O-ring groove 22. When attaching the cathode 5 to the cathode base 8, the cathode 5 is drawn toward the cathode base 8 by screwing the high-voltage feeder rods 12 thereinto. Thereby, the O-ring 23 is crushed to seal the space between the cathode 5 and the cathode base 8.

As shown in FIG. 2 and FIG. 3, the upper portions of a plurality of return plates 9 made of plate-shaped conductive material are fixed to the lower portion of the inner wall near the chamber opening 7 of the laser chamber 2 with bolts 20A at predetermined intervals in the longitudinal direction. An anode base 6 made of a conductive material is fixed to the lower portions of the return plates 9 with bolts 20B, and the anode 4 is mounted on the top of the anode base 6 to oppose to the cathode 5. The laser chamber 2 is connected to a ground side GND of the high-voltage power supply 13 via the discharge circuit not illustrated, whereby the anode 4 has the same electric potential as the laser chamber 2 through the return plates 9.

Preionization electrodes 18 and 18 are disposed along the longitudinal direction on both sides of the anode 4. The preionization electrode 18 includes an electric conductor portion 18A and an insulator portion 18B covering the outer periphery of the electric conductor portion 18A. Feeder insulating members 21 made of an insulating material penetrate through both end portions in the longitudinal direction of the laser chamber 2, and preionization feeder rods 15 made of a conductive material penetrate through the inside of the feeder insulating members 21.

Both of the space between the laser chamber 2 and the feeder insulating member 21 and the space between the feeder insulating member 21 and the preionization feeder rod 15 are sealed with the O-rings not illustrated. The electric conductor portion 18A of the preionization electrode 18 and the preionization feeder rod 15 are electrically connected inside the feeder insulating member 21. The high-voltage side HV of the negative high-voltage power supply 13 is connected to the preionization feeder rod 15 via a preionization circuit not illustrated and supplies a high-voltage current to the preionization electrode 18.

When oscillating laser light, a negative high-voltage is applied to the preionization electrodes 18 through the preionization feeder rods 15. Thereby, a preionization discharge is performed and the laser gases between the discharge electrodes 4 and 5 are ionized. At the almost same time, the negative high-voltage is applied to the cathode 5 through the high-voltage feeder rods 12. Thus, main discharge occurs between the discharge electrodes 4 and 5 to excite the laser gases and oscillate laser light.

As described above, according to the first embodiment, the O-ring groove 22 is disposed at the bottom surface 5A of the cathode so as to surround a plurality of the cathode bolt holes 24. Thus, intervals between the high-voltage feeder rods 12 can be narrowed, compared with a prior art in which each of the high-voltage feeder rods 12 is surrounded by the O-ring grooves 122, so that the number of the high-voltage feeder rods 12 can be increased.

Therefore, as the high-voltage current flows into the cathode 5 through the increased number of the high-voltage feeder rods 12, the high-voltage current flowing to each of the high-voltage feeder rods 12 decreases, so that the high-voltage current is supplied to the cathode 5 in the longitudinal direction 5 more equally. As the result, discharge concentrations decrease due to uniform main discharge, whereby the variations in pulse energy of laser light decrease.

Moreover, the high-voltage feeder rods 12 are disposed inside the end portions 5C and 5C of the cathode 5. Thus, the high-voltage current supplied to the end portions 5C and 5C is decreased, in which the discharge is easy to be concentrated compared with that of the center part in the longitudinal direction of the cathode 5, so that the discharge concentrations are further decreased.

Hereinafter, examples of experiments according to the first embodiment will be described. In the examples of the experiments, while a cathode 105 based on the prior art supplies a high-voltage current by using 20 high-voltage feeder bolts 112, it is made possible to use the 34 high-voltage feeder rods 12 for supplying the high-voltage current in the first embodiment.

Figure 6:
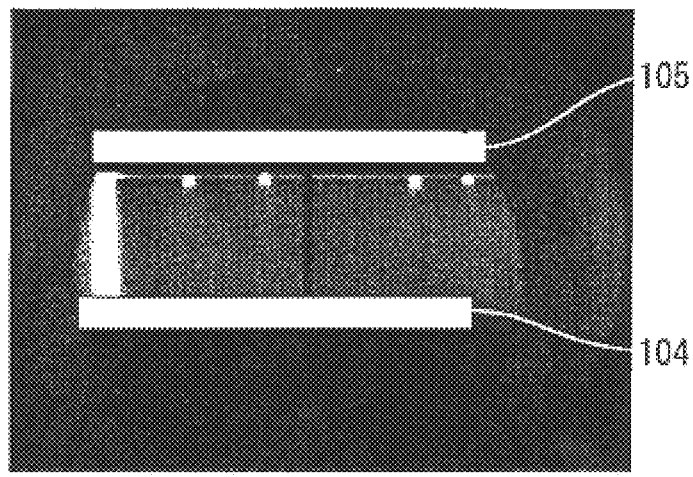
FIG. 6 is an explanatory view showing the situation of main discharge near the end portion by using a discharge electrode based on a prior art, according to a comparative example in the first embodiment.
Figure 7:
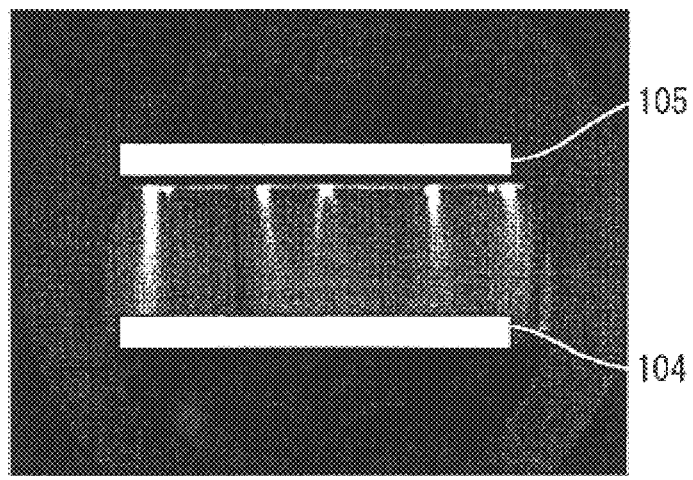
FIG. 7 is an explanatory view showing the situation of main discharge near the center portion by using the discharge electrode based on the prior art, according to the comparative example in the first embodiment.
Figure 8:
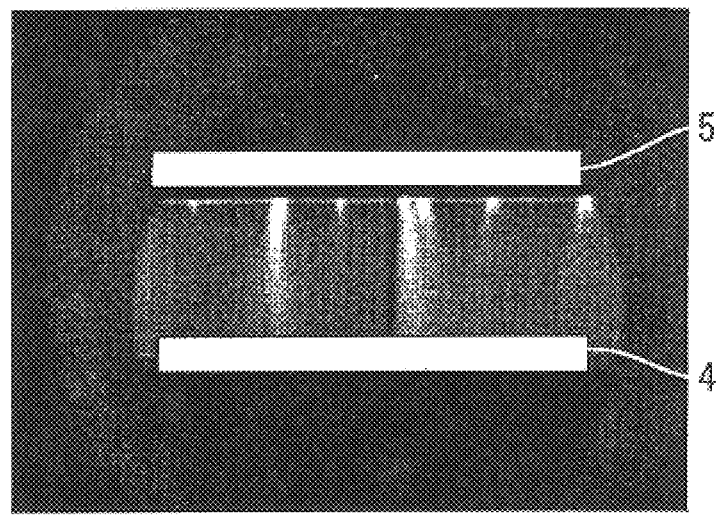
FIG. 8 is an explanatory view showing the situation of main discharge near the end portion by using a discharge electrode according to the first embodiment.
Figure 9:
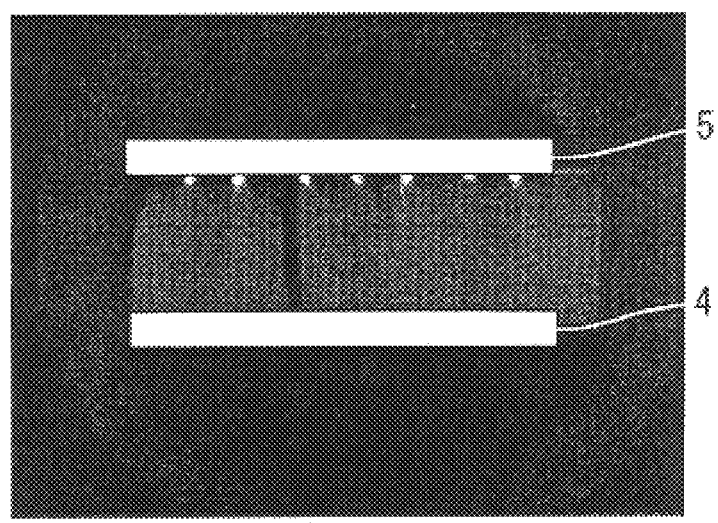
FIG. 9 is an explanatory view showing the situation of main discharge near the center portion by using the discharge electrode according to the first embodiment.

FIG. 6 and FIG. 7 show main discharges between discharge electrodes 104 and 105 by using the cathode 105 based on the prior art. FIG. 6 shows main discharge near the end portion of the cathode 105 and FIG. 7 shows main discharge in the almost center of the same, respectively. Further, FIG. 8 and FIG. 9 respectively show main discharges between the discharge electrodes 4 and 5 by using the cathode 5 according to the first embodiment. FIG. 8 shows main discharge near the end portion 5C of the cathode 5 and FIG. 9 shows main discharge in the almost center of the same, respectively. In FIG. 6 and FIG. 7, there are observed many portions where the discharge is concentrated and not uniform, while in FIG. 8 and FIG. 9, the portions where the discharge is concentrated are decreased and the electric discharge is stabilized. Particularly, as shown in FIG. 9, the concentrations of the discharge near the end portion 5C of the cathode 5 decrease to obtain stable main discharge.

Figure 10:
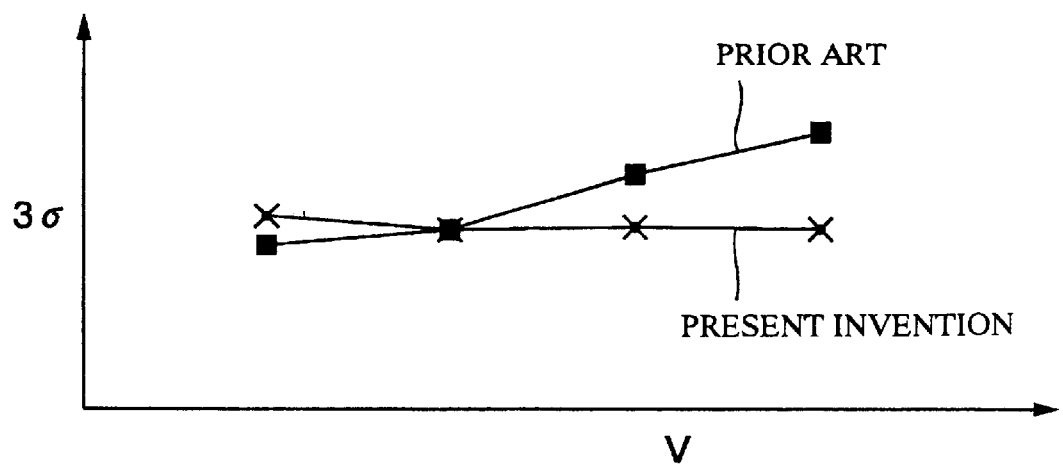
FIG. 10 is a graph depicting a relationship between a high-voltage applied to a space between the discharge electrodes according to the first embodiment and variations in a pulse output of laser light.

In FIG. 10, a relationship between a high-voltage V applied to the space between the discharge electrodes 4 and 5 and variations in a pulse output of laser light are shown in a graph. The lateral axis shows the high-voltage V and the vertical axis shows "$3\sigma$(=3 times the standard deviation $\sigma$)" showing the variations in the pulse output. The smaller value of this "$3\sigma$" means the smaller variations in the pulse output. In FIG. 10, data which is plotted with "■" shows the data using the cathode 105 based on the prior art, and data which is plotted with "X" shows the data using the cathode 5 according to the first embodiment of the present invention. As shown in FIG. 10, it is clear that the variations in the pulse energy of laser light are decreased by using the cathode 5 according to the first embodiment.

Figure 11:
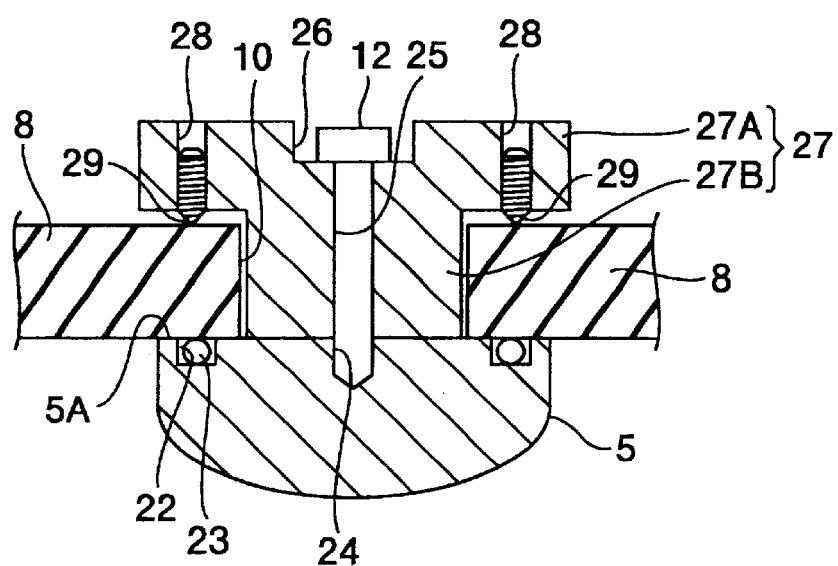
FIG. 11 is a side sectional view of the portion near a cathode and a cathode base according to a second embodiment.
Figure 12:
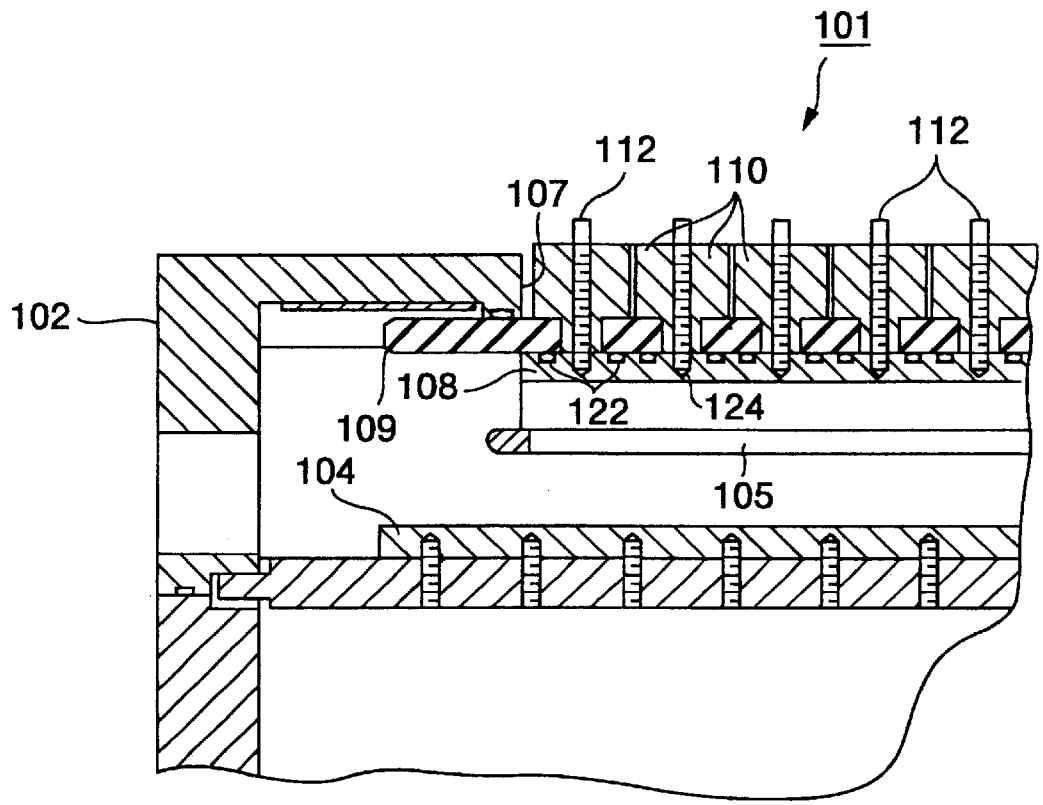
FIG. 12 is an explanatory view showing the structure of an excimer laser device based on the prior art.
Figure 13:
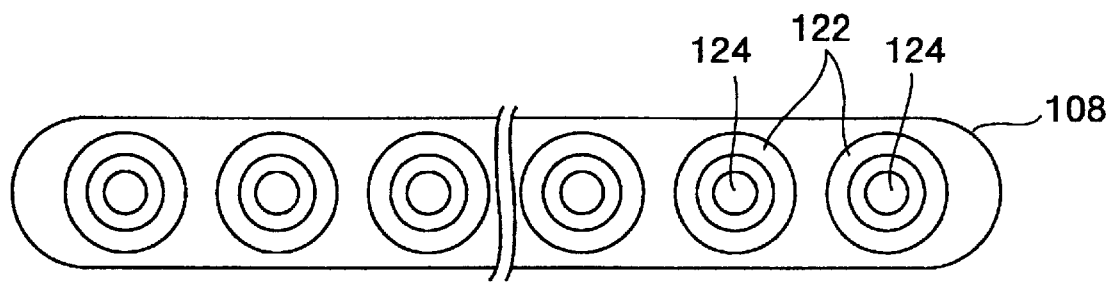
FIG. 13 is a bottom view of a cathode in FIG. 12.

Next, a second embodiment will be explained. FIG. 11 shows a side sectional view near the cathode 5 and the cathode base 8 of the excimer laser device 1 according to the second embodiment.

In FIG. 11, a base opening 10 is disposed at the cathode base 8, and a lower portion 27B of a cathode bar 27 having a T-shaped section is inserted into the base opening 10. An upper portion 27A of the cathode bar 27 is made to be larger than the base opening 10, and is disposed on the top of the cathode base 8.

In the almost center in the width direction of the cathode bar 27, the base through-holes 25 each having a spot facing 26 are disposed at predetermined intervals in the longitudinal direction. The high-voltage feeder rod 12 penetrates through the base through-hole 25, and the high-voltage feeder rod 12 is screwed into the cathode bolt hole 24 disposed in the bottom surface 5A of the cathode 5. On the bottom surface 5A of the cathode 5, the O-ring groove 22 which is similar to that of the first embodiment is formed and the O-ring 23 is inserted inside the O-ring groove 22. On both sides of the spot facing 26 of the cathode bar 27, screw through-holes 28 are penetratingly disposed at predetermined intervals in the longitudinal direction. A set screw 29 is inserted to each of the screw through-holes 28.

When attaching the cathode 5 to the cathode base 8, the high-voltage feeder rod 12 is screwed into the cathode bolt hole 24 so as to fix the cathode bar 27 and the cathode 5 to each other, and after they are fixed, the set screws 29 are screwed into the screw through-holes 28. Thus, the cathode bar 27 rises against the cathode base 8 so that the cathode 5 is drawn toward the cathode base 8 through the high-voltage feeder rod 12. As a result, the O-rings 23 are crushed to seal the space between the cathode 5 and the cathode base 8.

As described above, according to the second embodiment, the cathode bar 27 and the cathode 5 contact each other on their faces, and both of the high-voltage feeder rod 12 and the cathode bar 27 supply the high-voltage current to the cathode 5. Thus, since the high-voltage current is continuously and uniformly supplied from the cathode bar 27 to the cathode 5 in the longitudinal direction, the discharge concentrations are further decreased. Therefore, main discharge is stabilized so that the variations in the pulse energy decrease.

Incidentally, although it is explained in the second embodiment that the cathode bar 27 is in a T-shape having the upper portion 27A and the lower portion 27B, the cathode bar 27 may have a structure which is divided to the upper portion 27A and the lower portion 27B.

Although the excimer laser device 1 is explained as an example in the aforesaid respective embodiments, it is not restrictive and may be embodied in other laser devices which excite the laser gases by electric discharge. Particularly, it can be embodied in a fluorine laser device in the exact same way as the excimer laser device.

As a means for sealing the cathode 5, the O-rings 11 and 23 are explained as examples, which are not restrictive; and it is effective to use, for example, a metal seal or the like. It is explained in the aforesaid respective embodiments that each of the cathode bolt holes 24 is respectively surrounded by one O-ring groove 22, which is not restrictive. Namely, one O-ring groove 22 may surround a plurality of the cathode bolt holes 24 so that there are disposed a plurality of the O-ring grooves 22 like this. For example, two O-ring grooves 22 may be disposed so as to respectively surround the cathode bolt holes 24 which are divided into two from the center in the longitudinal direction of the cathode 5.

Although it is explained that the O-ring groove 22 is disposed on the bottom surface 5A of the cathode 5, the O-ring groove 22 may be disposed on the surface of the cathode base 8 which contacts with the bottom surface 5A of the cathode 5. Alternatively, the O-ring groove 22 may be disposed on the metallic member which is disposed between the cathode 5 and the cathode base 8, as a cathode support member 108 in the prior art.

In order to supply the high-voltage, it is explained that the high-voltage feeder rods 12 with the external threads formed on the tips thereof are screwed into the cathode bolt holes 24 with the internal threads formed on an inner wall thereof, but it is not restrictive. For example, the tips of the high-voltage feeder rods 12 are sharpened to be in a shape of wood screws to thereby screwed into holes for fixing disposed in the cathode 5. Alternatively, the tips of the high-voltage feeder rods 12 are made to be split so that the high-voltage feeder rods 12 are driven into the holes for fixing disposed in the cathode 5 like anchors so as to be fixed to each other.

What is claimed is:

1. A discharge electrode for a laser device, comprising:

a cathode base made of an insulating material for sealing up a chamber opening provided in a laser chamber for containing laser gases;

a cathode attached to said cathode base with a bottom surface of said cathode in contact therewith; and a plurality of high-voltage feeder rods disposed in a longitudinal direction, penetrating through said cathode base from an outside of said laser chamber and supplying a high-voltage current to said cathode, wherein an O-ring groove for sealing in the laser gases is formed on the bottom surface of said cathode to surround a plurality of holes for fixing said high-voltage feeder rods disposed on the bottom surface of said cathode.

2. The discharge electrode for the laser device according to claim 1, further comprising:

a cathode bar in contact with said cathode on surfaces thereof, and wherein by means of said high-voltage feeder rods and said cathode bar a high-voltage current is supplied to said cathode.

* * * * *